United States Patent
Hutson et al.

(10) Patent No.: US 8,196,830 B1
(45) Date of Patent: Jun. 12, 2012

(54) HAND-OPERATED DOCUMENT READER/IMAGER WITH SPEED LIMITING DEVICE INCLUDING A VISCOUS DAMPER TO INSURE UNIFORM SCAN RATE

(75) Inventors: Sammy C. Hutson, Novi, MI (US); John C. Gudenburr, Canton, MI (US); Michael J. Moore, Beverly Hills, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1188 days.

(21) Appl. No.: 11/949,872

(22) Filed: Dec. 4, 2007

(51) Int. Cl.
*G06K 7/08* (2006.01)
(52) U.S. Cl. ........ 235/449; 235/439; 235/442; 235/446; 235/454
(58) Field of Classification Search .................. 235/449, 235/439, 442, 446, 454; 382/139
See application file for complete search history.

(56) References Cited

U.S. PATENT DOCUMENTS

| | | | | |
|---|---|---|---|---|
| 3,918,806 A | * | 11/1975 | Cook | 399/210 |
| 3,940,796 A | * | 2/1976 | Haun et al. | 360/2 |
| 5,519,511 A | * | 5/1996 | Tanahashi | 358/473 |
| 6,851,608 B1 | * | 2/2005 | Desai et al. | 235/449 |

* cited by examiner

*Primary Examiner* — Daniel Hess
*Assistant Examiner* — Rafferty Kelly
(74) *Attorney, Agent, or Firm* — Honigman Miller Schwartz and Cohn LLP

(57) ABSTRACT

A hand-operated document processor includes a base for receiving a document containing magnetic ink character data to be read and recognized. A manually operated moving magnetic ink character recognition (MICR) subsystem includes a MICR read head and is attached to the base such that movement of the subsystem causes the MICR read head to pass over the magnetic ink character data on the document. MICR reading and recognition logic receives the signal from the MICR read head. A speed limiting device includes a viscous damper, and is connected to the MICR subsystem. The viscous damper provides a resistance load when the MICR subsystem is moved across the document being processed. The resistance load increases as the operator increases the speed of the MICR subsystem to encourage the operator to maintain a constant scanning rate over the length of the document.

20 Claims, 7 Drawing Sheets

PNEUMATIC CYLINDER
RESISTANCE LOAD

HAND-OPERATED DOCUMENT READER/
IMAGER WITH PNEUMATIC CYLINDER

HAND-OPERATED DOCUMENT READER/IMAGER WITH SPEED LIMITING DEVICE INCLUDING A VISCOUS DAMPER TO INSURE UNIFORM SCAN RATE

BACKGROUND OF THE INVENTION

1. Field of the Invention

The invention relates to document processing, document imaging, and magnetic ink character recognition. The invention further relates to hand-operated document readers/imagers, and to methods and systems for providing controlled and repeatable motion in a non-motorized system.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time. There are also hand-operated document readers/imagers.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006 (formerly published as X9.27) "Print and Test Specifications for Magnetic Ink Printing (MICR)" as published by Accredited Standards Committee X9, Inc., Annapolis, Md., United States. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex schemes for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In a hand-operated document reader/imager, the document is placed on a base and the MICR/image device is moved over the document from right to left, which is the traditional direction of larger document readers. During this movement, the MICR characters are recognized and the front image of the document is captured.

In more detail, the operational sequence of a manually operated linear check or document scanning device is as follows. A check or document is positioned on the bed of the device. The module that holds the contact image sensor and the magnetic read head is moved across the check or document, with the module being guided by a linear rod. The magnetic read head reads the MICR code line at the bottom of the document, and the contact image sensor scans the document. Data from both devices are passed to the electronics of the system for processing.

In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error.

The contact image sensor has a maximum speed limit, beyond which it will fail to operate properly. And, the MICR reader has a minimum speed limit, below which it cannot reliably operate. Accordingly, the speed of the scan must remain between these limits.

A motorized system can provide the required speed control, but is expensive. With a simple inexpensive manual operation, the scanning speed can and will vary from item to item, and over the length of the scan of a single item.

In order to eliminate operator fatigue and possible ergonomic issues, it is desirable to keep the operating force as low as possible; however, low force at high speeds allows the operator too much freedom to slide the module at a higher than desirable speed. The use of a conventional spring to slow down the scanning rate will provide variable force, and therefore variable speed over the length of the scan. The use of a clutch or braking mechanism will typically lead to wear and higher maintenance over the life of the product.

For the foregoing reasons, there is a need for an improved method and system for providing controlled and repeatable motion in a non-motorized hand-operated reader/imager.

SUMMARY OF INVENTION

It is an object of the invention to provide an improved method and system for providing controlled and repeatable motion in a non-motorized hand-operated reader/imager.

According to the invention, a hand-operated document processor comprises a base for receiving a document containing magnetic ink character data to be read and recognized, and a moving magnetic ink character recognition (MICR) subsystem. The subsystem includes a MICR read head and is attached to the base such that movement of the subsystem causes the MICR read head to pass over the magnetic ink character data on the document. MICR reading and recognition logic receives the signal from the MICR read head.

In some implementations, the moving MICR subsystem further comprises an image sensor that passes over the document as the MICR read head passes over, the magnetic ink character data on the document.

Typically, the operator provides the force necessary to drive the moving MICR subsystem. In operation of the preferred embodiment of the hand-operated document processor, with the MICR subsystem at the start position, the document is positioned on the base of the band-operated document reader/imager. The operator slides the MICR subsystem across the document.

To provide velocity control over the required scanning distance, the invention comprehends the use of a dashpot or viscous damper. In the preferred embodiment of the hand-operated document processor, a pneumatic cylinder mechanism is connected to the MICR subsystem or scanning module by, for example, a belt and pulley system. The act of moving the module across the length of the check or document being scanned will drive the piston in the pneumatic cylinder at a rate that is directly proportional to the speed of the scanning module.

A reduction mechanism, for example, in the form of a pulley ratio or gear reduction may allow travel of the piston to be less than the travel of the scanning module to reduce the size and complexity of the cylinder and associated drive and return mechanism.

In a preferred embodiment, the cylinder is constructed with one or more bleed orifices in the cylinder that will be sized to provide minimal resistance to movement at slow speeds and very high resistance to movement at speeds that approach the speed limit of the contact image sensor.

The physics of a dashpot or viscous damper, such as a pneumatic cylinder with a bleed orifice, provide constant resistance force at a constant speed. Motion of the scanning mechanism in the desirable speed range will have minimal, low resistance. The orifices may be fixed in size or may be adjustable so that the system could be tuned to a specific operator or to allow adjustment to tune out any variations in friction and system drag during manufacture and over the life of the system.

In the preferred construction, the pneumatic cylinder will provide either equal or a different constant resistance to motion in the return direction, allowing a controlled but not necessarily equal scan rate as the scanning module is moved from right to left or left to right if scanning in both directions is desirable (or little or no load for fast reset). Such functionality may be achieved through the use of reed valves to open and close orifices, depending on the direction of travel.

Advantageously, with this resistance load that increases as the operator increases the speed of actuating the scanning module, the natural tendency of the operator will be to move the module at a rate that provides a comfortable resistance load, maintaining a fairly constant scanning rate over the entire length of travel. This will simplify the measurement of the scanning speed and the natural tendency to scan at a constant speed should reduce the complexity of the electronics and reduce the error rate.

DETAILED DESCRIPTION OF THE PREFERRED EMBODIMENTS

The E-13B character set contains ten characters and four symbols as defined in the ANS X9.100-20-2006 (formerly published as X9.27) "Print and Test Specifications for Magnetic Ink Printing (MICR)" as published by Accredited Standards Committee X9, Inc., Annapolis, Md., United States. When used on a document for automated machine reading, the characters and symbols in the set must be printed using magnetic ink. ANS X9.100-20-2006 defines the dimensions of each character/symbol and the expected nominal waveform peak position and relative amplitude of waveform peaks.

Figure 1:
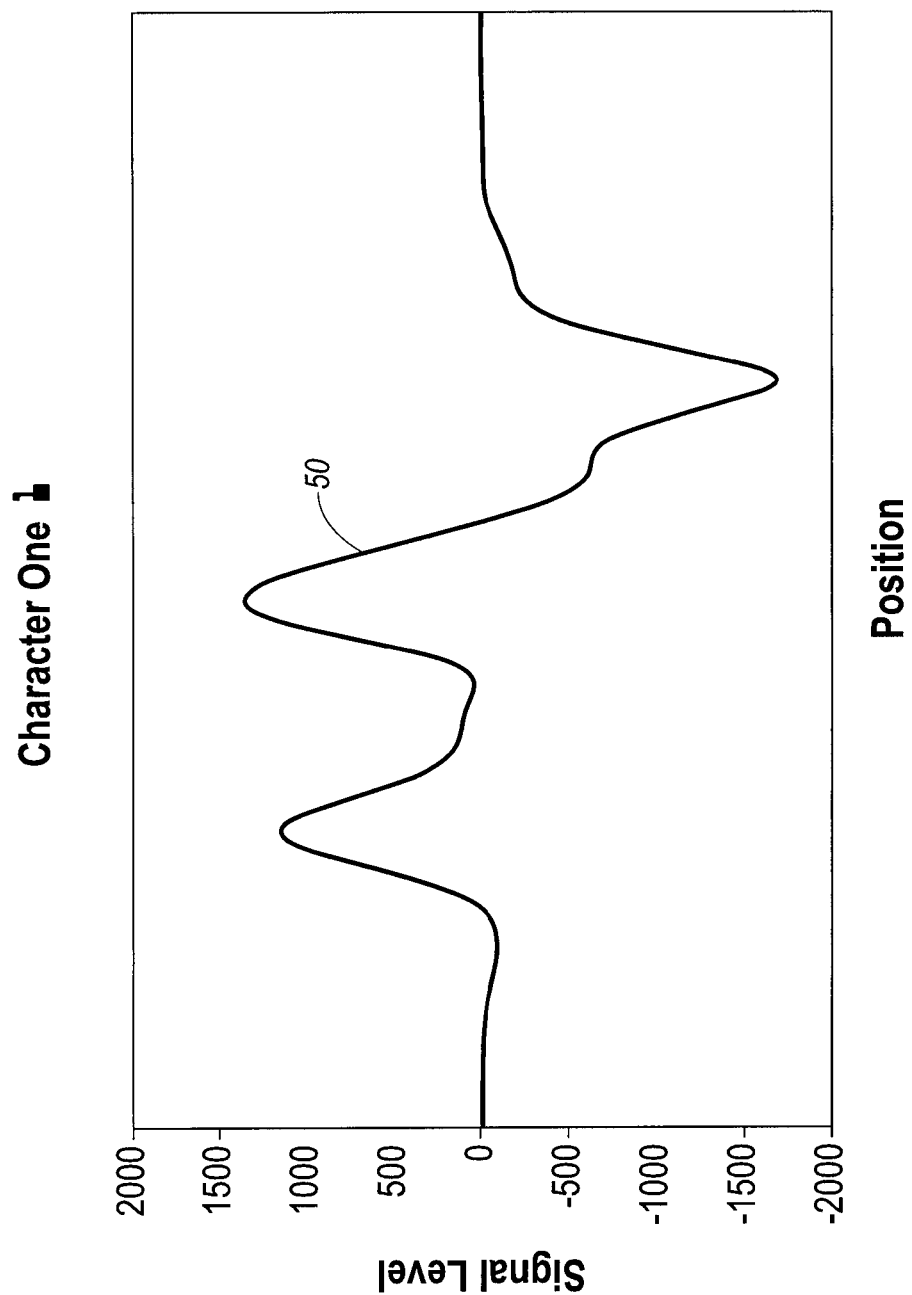
FIG. 1 shows the waveform for the magnetic ink character one, from the E-13B MICR character set as used on many financial payment documents, as read from a responsive magnetic signal gap read head when the magnetized character is passed by the magnetic read head.

FIG. 1 shows the waveform for the magnetic ink character one, from the E-13B MICR character set, as read from a responsive magnetic signal gap read head when the magnetized character is passed by the magnetic read head. The waveform is indicated at 50. As illustrated, the x-axis represents the position of the read head, and the y-axis represents the signal level.

MICR reading and recognition generally involves determining peak position information for a waveform generated by a single gap magnetic read head that passes over the magnetic ink characters on a document. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006.

Figure 2:
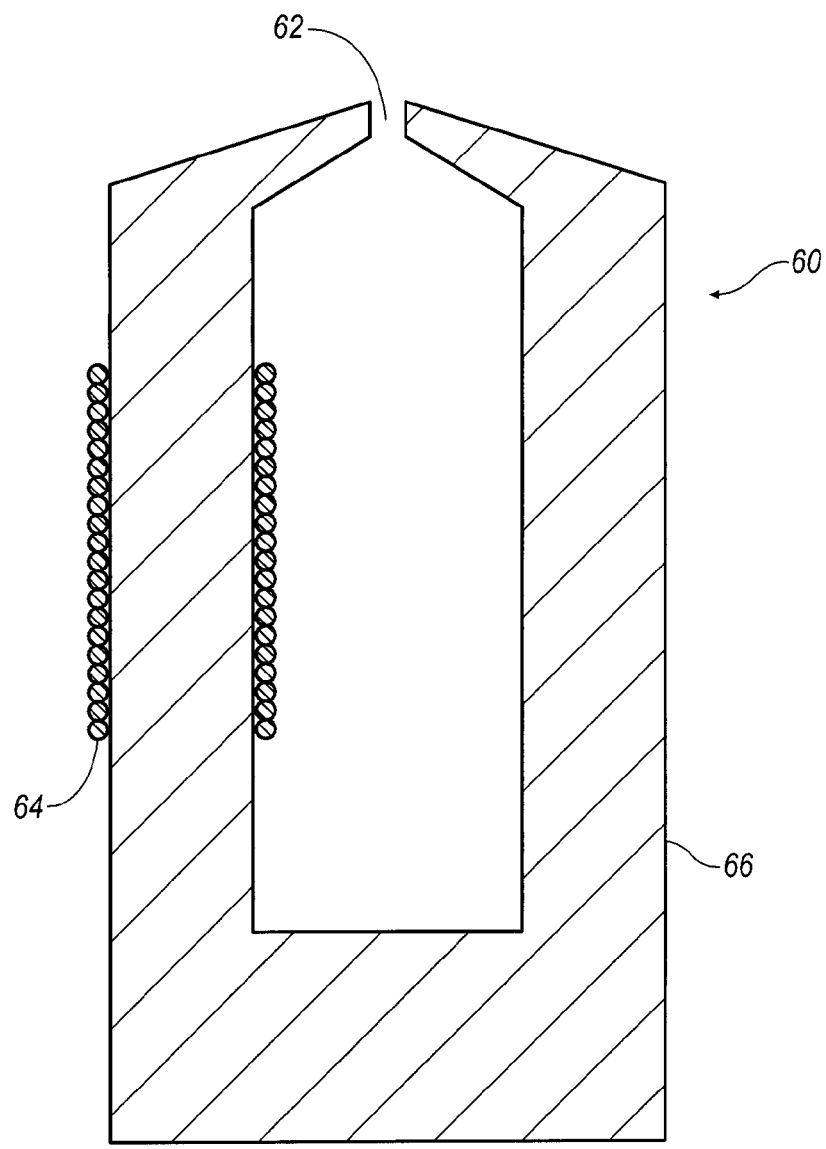
FIG. 2 is a cross-section view of a read head, which is one example of a suitable read head for reading magnetic ink characters.

In FIG. 2, a read head is generally indicated at 60, and includes a gap 62. The read head utilizes sensing coil 64. Core 66 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 3:
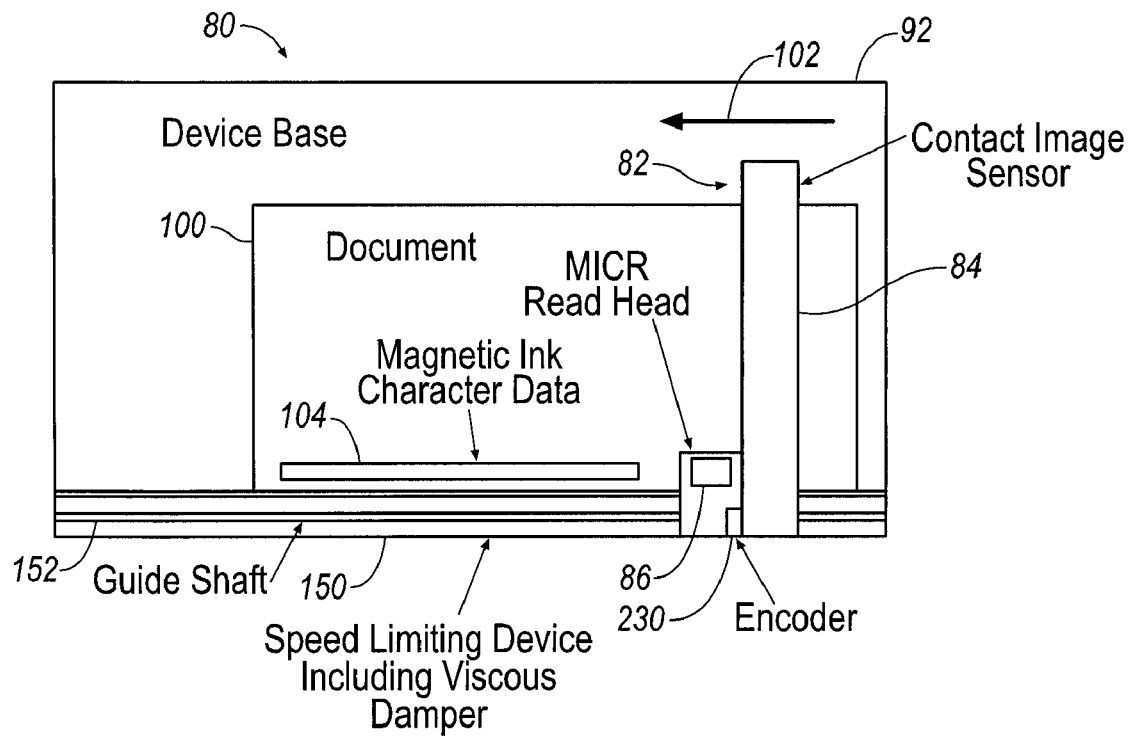
FIG. 3 illustrates a top view of a hand-operated document reader/imager made in accordance with the invention.
Figure 4:
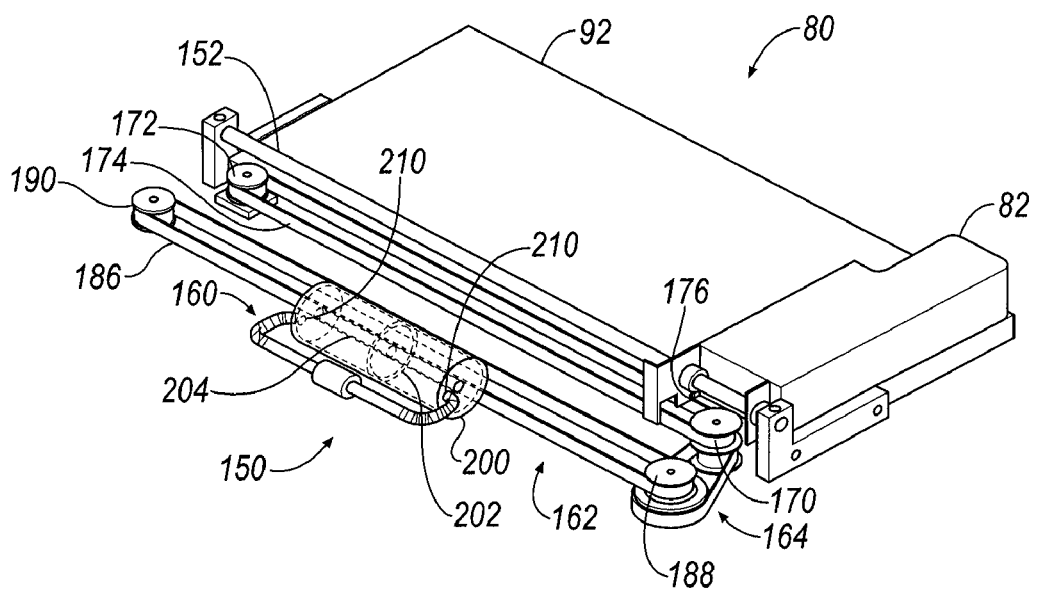
FIG. 4 illustrates a schematic diagram depicting the speed limiting device including the pneumatic cylinder to insure a uniform scan rate in an exemplary implementation.
Figure 5:
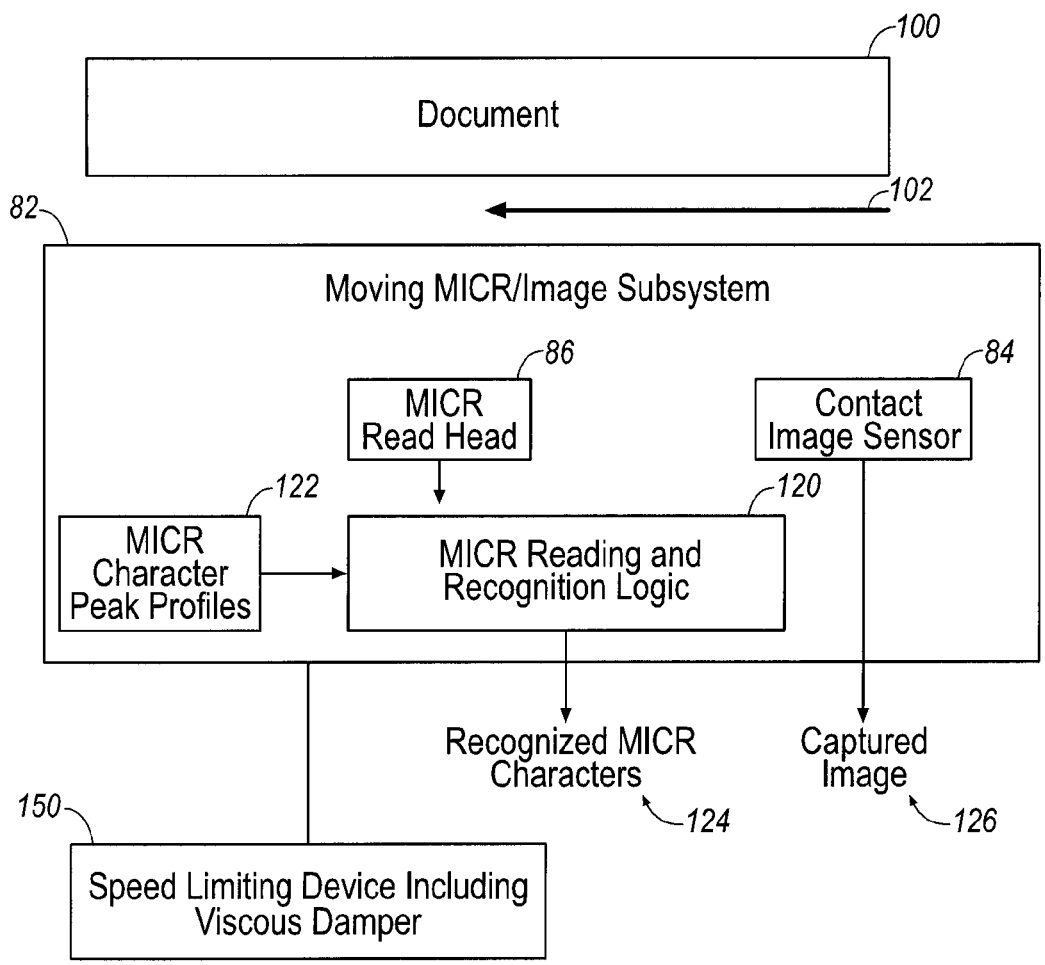
FIG. 5 is a block diagram illustrating a moving MICR/image subsystem including a speed limiting device having a viscous damper.

An exemplary embodiment of the invention is illustrated in FIGS. 3-5. FIGS. 3 and 4 illustrate a hand-operated document reader/imager 80. As best shown in FIG. 3, document reader/imager 80 includes a moving MICR/image subsystem 82. Subsystem 82 includes a contact image sensor 84, and a MICR read head 86. Contact image sensor 84 captures an image of the document 100 when subsystem 82 is moved across the document 100. Contact image sensor 84 captures the front image of the document 100 when the document 100 is placed face-up on the base 92 of the reader/imager 80 and the MICR/image subsystem 82 is moved from right to left over document 100 as indicated by arrow 102.

MICR read head 86 is for reading the magnetic ink character data 104 on document 100. During the front image capture, the MICR code line is read according to a traditional MICR algorithm as MICR read head 86 passes from right to left over the magnetic ink character data 104 on document 100.

With continuing reference to FIGS. 3 and 4, in the typical operation, the operator provides the force needed to move the MICR/image subsystem 82 over the document 100. To provide further velocity control over the required scanning distance, a speed limiting device 150 includes a dashpot or viscous damper. In FIG. 4, the viscous damper takes the form of a pneumatic cylinder mechanism 160. The pneumatic cylinder mechanism 160 is connected by a belt and pulley system 162 to a belt and pulley speed reduction mechanism 164 to provide constant resistance force at a constant scanning speed of the MICR/image subsystem 82. Moving MICR/image subsystem 82 rides along a linear guide shaft 152 and holds the contact image sensor 84 and the magnetic read head 86. The magnetic read head 86 reads the MICR code line 104 at the bottom of the document 100, and the contact image sensor 84 scans the document 100. In further detail, the belt and pulley reduction mechanism 164 is driven by pulley 170. Pulley 170 is connected to pulley 172 by belt 174. MICR/image subsystem 82 is secured, at attachment member 176, to belt 174 such that pneumatic cylinder mechanism 160 is able to provide resistance force to the MICR/image subsystem 82.

In more detail, belt and pulley system 162 includes belt 186 and pulleys 188 and 190, holding belt 186. Pneumatic cylinder mechanism 160 includes double-ended pneumatic cylinder 200 and piston 202. On each side of piston 202, belt 186 is connected to an end of a piston rod 204, and cylinder 200 is secured with respect to piston 202. Speed reduction mechanism 164 allows travel of piston 202 to be less than the travel of the MICR subsystem 82 to reduce the size and complexity of the assembly. In operation, with the MICR/image subsystem 82 at the start position (as depicted in FIG. 4), a document is positioned on the base 92 of the hand-operated reader/imager 80. The operator slides the MICR subsystem 82 across the length of the check or document being scanned and will drive piston 202 in the pneumatic cylinder 200 at a rate that is directly proportional to the speed of the MICR subsystem 82.

In the preferred embodiment illustrated in FIGS. 3 and 4, the cylinder 200 is constructed with a pair of bleed orifices 210 sized to provide minimal resistance to movement at slow speeds and very high resistance to movement at speeds that approach the speed limit of the contact image sensor 84. The orifices 210 may be adjustable to tune out any variations in friction and system drag during manufacture and over the life of the system, or so that the system could be tuned to a specific operator.

Figure 6:
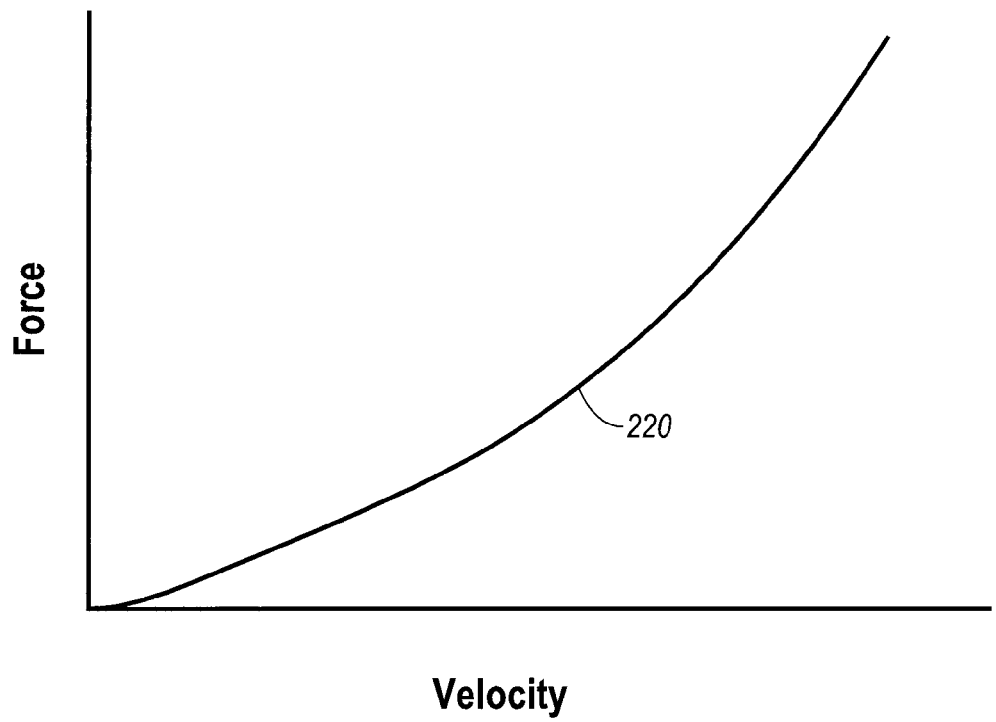
FIG. 6 is a plot of force versus velocity for a pneumatic cylinder resistance load.

FIG. 6 is a plot of force versus velocity for a pneumatic cylinder resistance load. As shown in FIG. 6 at 220, the physics of the pneumatic cylinder with the bleed orifices or other suitable dashpot or viscous damper type device provide constant resistance force at a constant speed of the MICR/image subsystem. Motion of the scanning mechanism in the desirable speed range will have minimal, low resistance. In the preferred construction, the pneumatic cylinder will provide either equal or a different constant resistance to motion in the return direction, allowing a controlled but not necessarily equal scan rate as the scanning module is moved from right to left or left to right if scanning in both directions is desirable (or little or no load for fast reset). Such functionality may be achieved through the use of reed valves to open and close orifices, depending on the direction of travel.

Figure 7:
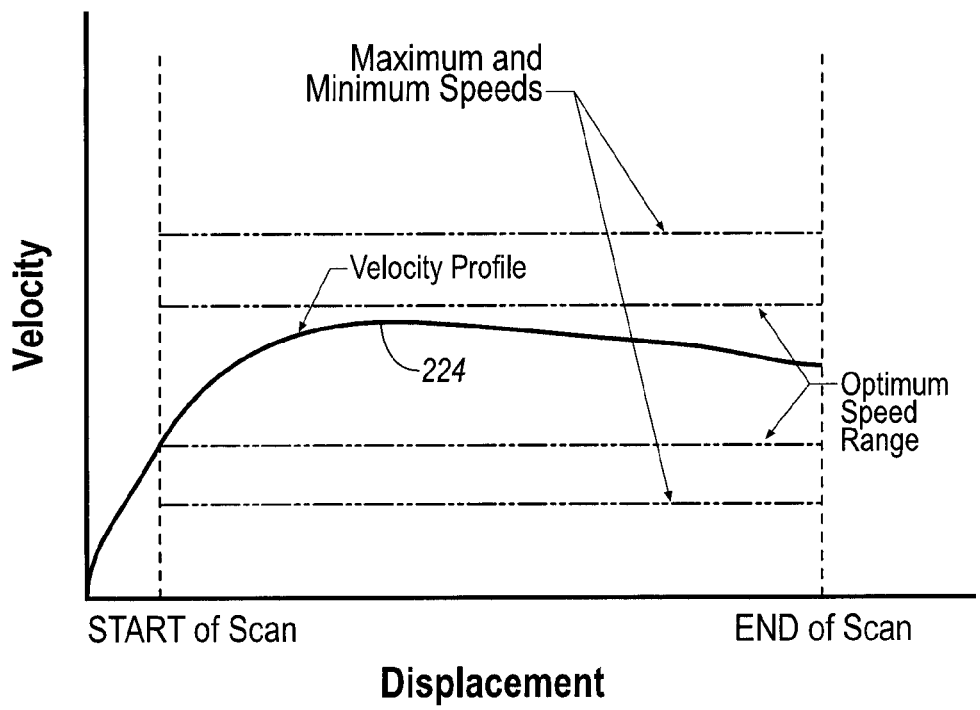
FIG. 7 is a plot of velocity versus displacement for the MICR subsystem when using the pneumatic cylinder.

With this resistance load that increases as the operator increases the speed of actuating the scanning module, the natural tendency of the operator will be to move the module at a rate that provides a comfortable resistance load, maintaining a fairly constant scanning rate over the entire length of travel. This will simplify the measurement of the scanning speed and the natural tendency to scan at a constant speed should reduce the complexity of the electronics and reduce the error rate. FIG. 7 is a plot of velocity versus displacement for the MICR subsystem 82 when using the pneumatic cylinder mechanism, and depicts the velocity profile for the MICR subsystem 82 at 224.

Typically, a signal indicative of the speed of the MICR subsystem 82 is provided to the MICR reading and recognition logic during the scan operation. In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error. A hand-operated document reader/imager requires a method of determining the position, and thus the speed, of the MICR and image sensors due to the variable speed nature of the manual operation. Existing solutions use optical encoders to provide this position feedback. Optical encoders are typically attached directly to the shaft of a wheel that moves along the document being scanned, or are connected to this shaft through a series of gears. For example, as shown in FIG. 3, a suitable encoder 230 measures the speed of the MICR subsystem. An output signal from encoder 230 is provided to the MICR reading and recognition logic during the scan operation.

FIG. 5 illustrates the moving MICR/image subsystem 82 in block diagram form, including the contact image sensor 84, MICR read head 86, and speed limiting device 150 which may take the form of the above-described pneumatic cylinder mechanism. As shown, the document 100 is placed on the base of the reader/imager for front image capture. Moving MICR/image subsystem 82 is moved across the document 100 as indicated by arrow 102. Block 120 represents the MICR reading and recognition logic. Logic 120 includes a traditional MICR algorithm as understood by one of ordinary skill in the art.

In the traditional MICR algorithm, the waveform obtained from the read head 86 is compared against known MICR character peak profiles 122. If the recognition is successful, the MICR reading and recognition logic 120 determines the recognized MICR characters 124. The traditional MICR algorithm is applied during the front image capture by contact image sensor 84 of a face-up document. The captured image is indicated at 126.

Logic 120 must be capable of determining the speed of the MICR and image sensors due to the variable nature of the manual operation. In accordance with the invention, speed limiting device 150 provides viscous damping to insure a uniform scan rate of the MICR/image subsystem 82. Speed feedback to the MICR reading and recognition logic 120 may be provided in any suitable way.

Figure 8:
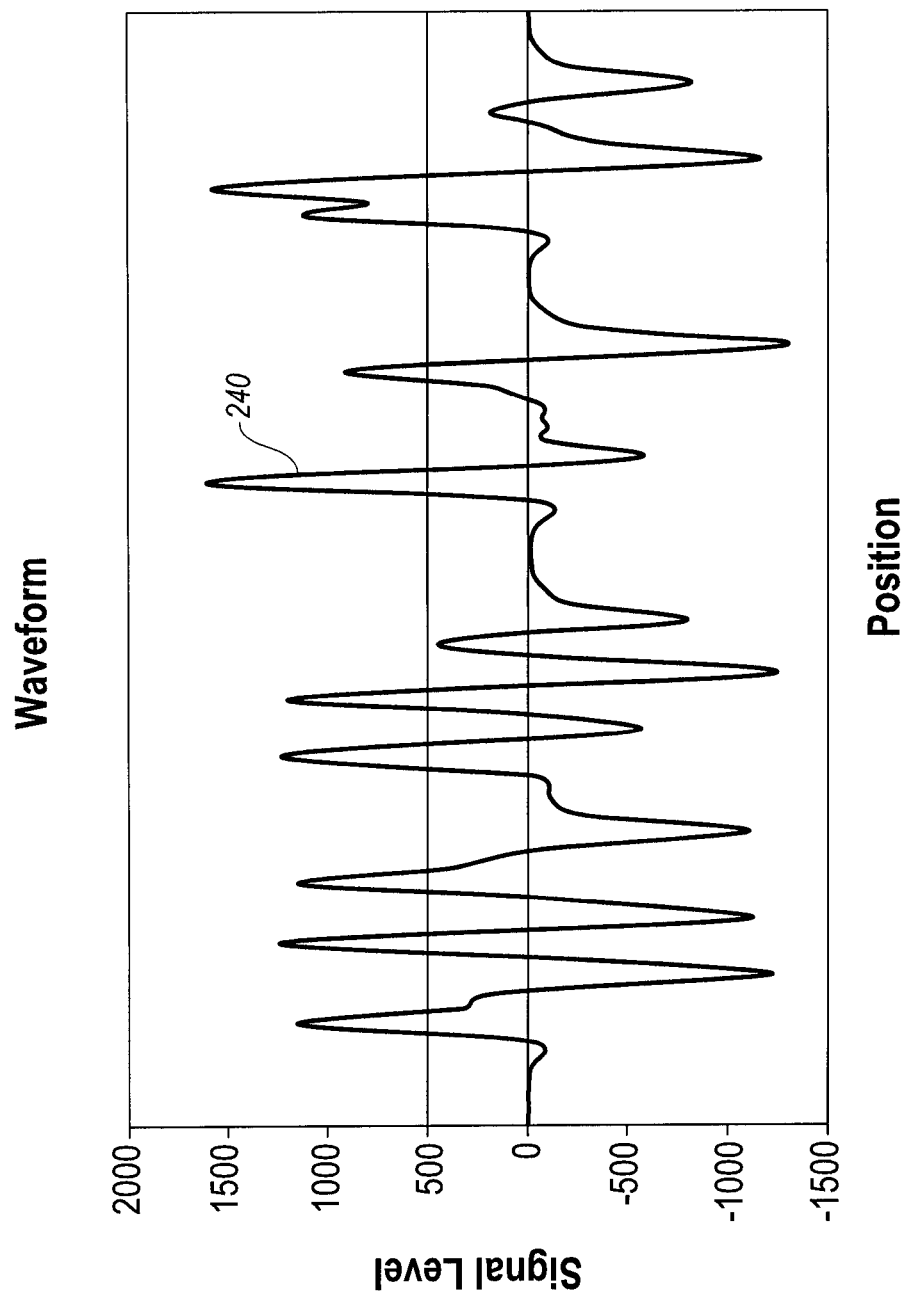
FIG. 8 illustrates a waveform for magnetic ink characters/symbols 3, 5, 7, Amount when the document containing the characters/symbols is inserted face up for front image capture in the hand-operated document reader/imager, and the magnetic ink characters/symbols are passed over from right to left.

FIG. 8 illustrates a waveform 240 for magnetic ink characters/symbols 3, 5, 7, Amount when the document containing the characters/symbols is inserted face up for front image capture in the hand-operated document reader/imager, and the magnetic ink characters/symbols are passed over from right to left. As illustrated, the x-axis represents the position of the read head, and the y-axis represents the signal level. The MICR reading and recognition logic is able to produce the waveform depicted at 240 based on the signal from the MICR read head and the speed feedback signal. In this way, the MICR reading and recognition logic can consider the MICR read head speed during reading and recognition. Consideration of MICR read head speed is required because speed variations affect the amount of time between the peaks of each character (as well as the amplitudes of the peaks due to the variation in the rate of change of the magnetic flux resulting from the variation in the read head speed). By considering the read head speed, the time information is able to be converted into distance information, which can be compared to the MICR character peak profiles as contained in ANS X9.100-20-2006.

In one implementation, in order to obtain optimal MER results, the MICR read head signal is sampled at a resolution of 1,000 samples per inch. The sampling rate of the MICR subsystem is varied based on the sensed speed. For example, in order to achieve 1,000 samples per inch, a speed feedback mechanism commands the MICR sampling subsystem to sample every 0.001 inches. In the embodiment of the invention illustrated in FIGS. 3-5, this speed feedback is provided by the encoder 230. Similarly, speed feedback could be used to command the imaging subsystem to achieve a desired samples/inch resolution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus, comprising:
a document processor including:
    a base having an upper surface;
    a magnetic ink character recognition (MICR) subsystem including a MICR read head, wherein the MICR subsystem is arranged:
        (1) in an opposing relationship with respect to the upper surface of the base, and
        (2) slidably-attached to the base for movement of the subsystem across the upper surface of the base between a first lateral side surface of the base and a second lateral side surface of the base; and
    a speed limiting device connected to both of the base and the MICR subsystem, wherein the speed limiting devices includes a slidable movement resistance device that imparts a controlled slidable movement resistance load to the MICR subsystem when the MICR subsystem is slidably-moved across the upper surface of the base to maintain a controlled scanning rate performed by the MICR read head as the MICR subsystem is slidably-moved across the upper surface of the base.

2. The apparatus of claim 1 wherein the slidable movement resistance device includes
a dashpot that comprises:
    a piston connected to a piston rod, and
    a double-ended pneumatic cylinder, wherein the piston and the piston rod are disposed in the double-ended pneumatic cylinder, wherein the slidable movement of the MICR subsystem across the upper surface of the base drives the piston in the double-ended pneumatic cylinder.

3. The apparatus of claim 2 further comprising:
an attachment member extending from the MICR subsystem, wherein the attachment member includes a passage;
a linear guide shaft including a first end and a second end, wherein the first end is attached to the first lateral side surface of the base, wherein the second end is attached to the second lateral side surface of the base, wherein the linear guide shaft is arranged within the passage of the attachment member, wherein the linear guide shaft linearly-guides the slidable movement of the MICR subsystem across the upper surface of the base.

4. The apparatus of claim 3 further comprising:
a first belt and pulley arrangement including a first pair of pulleys connected by a first belt, wherein the attachment member is connected to the first belt for attaching the MICR subsystem to the first belt;
a second belt and pulley arrangement including a second pair of pulleys connected by a second belt; and
a third belt that connects a pulley of each of the first and second pair of pulleys for connecting the first belt and pulley arrangement to the second belt and pulley arrangement.

5. The apparatus of claim 4, wherein the second belt is connected to an end of the piston rod for connecting the speed limiting device to both of the base and the MICR subsystem.

6. The apparatus of claim 5, wherein the double-ended pneumatic cylinder includes
at least one bleed orifice that refines the controlled slidable movement resistance load to have a value between:
    (1) a minimum resistance value when the slidable movement of the MICR subsystem is conducted at about a minimum speed limit associated with the MICR read head, and
    (2) a high resistance value when the slidable movement of the MICR subsystem is conducted at about a maximum speed limit associated with a contact image sensor connected to the MICR subsystem.

7. The apparatus of claim 6, wherein a size of the at least one bleed orifice is non-adjustably fixed.

8. The apparatus of claim 5, wherein a size of the at least one bleed orifice is adjustable.

9. The apparatus of claim 8 further comprising:
at least one valve in communication with the at least one bleed orifice, wherein the valve permits the at least one bleed orifice to be arranged in one of an opened or closed orientation.

10. The apparatus of claim 1, wherein the MICR read head includes
MICR reading and recognition logic that is communicatively-coupled to the MICR read head; and
an encoder that is communicatively-coupled to the MICR reading and recognition logic, wherein the MICR reading and recognition logic receives:
    a first output signal from the MICR read head, and
    a second output signal from the encoder, wherein the first output signal includes a magnetic ink character signal, wherein the second output signal includes speed feedback information of the MICR subsystem resulting from the slidable movement of the MICR subsystem across the upper surface of the base.

11. The apparatus of claim 1 wherein the MICR subsystem further comprises:
a contact image sensor.

12. The apparatus of claim 1, wherein the controlled slidable movement resistance load to the MICR subsystem is a constant slidable movement resistance load such that the controlled scanning rate performed by the MICR read is an equal scanning rate.

13. The apparatus of claim 1, wherein the controlled slidable movement resistance load to the MICR subsystem is a non-constant slidable movement resistance load such that the controlled scanning rate performed by the MICR read is a non-equal scanning rate.

14. A method, comprising the steps of:
supportably-arranging a document in a fixed orientation upon an upper surface of a base of a document processor, wherein the document includes magnetic ink character data;
slidably-moving a MICR subsystem that is slidably-connected to the base across at least a portion of the upper surface of the base that supports the document in the fixed orientation, wherein the MICR subsystem includes a MICR read head; and
imparting a controlled slidable movement resistance load to the MICR subsystem from a speed limiting device that is connected to both of the base and the MICR subsystem as the MICR subsystem is slidably-moved for
maintaining a controlled scanning rate performed by the MICR read head when the MICR read head scans the magnetic ink character data of the document that is arranged in the fixed orientation upon the upper surface of the base of the document processor.

15. The method of claim 14, wherein the slidable movement resistance device includes a dashpot that comprises: a piston connected to a piston rod, and a double-ended pneumatic cylinder, wherein the piston and the piston rod are disposed in the double-ended pneumatic cylinder, wherein, responsive to the slidably-moving step, further comprising the step of
driving the piston in the double-ended pneumatic cylinder.

16. The method of claim 14, wherein the MICR read head includes-MICR reading and recognition logic that is communicatively-coupled to the MICR read head; and an encoder that is communicatively-coupled to the MICR reading and recognition logic, wherein, responsive to the slidably-moving step, further comprising the steps of
utilizing the MICR read head for reading the magnetic ink character data; and
receiving, at the MICR reading and recognition logic:
a first output signal from the MICR read head, and
a second output signal from the encoder, wherein the first output signal includes a magnetic ink character signal indicative of the magnetic character data that was read by the MICR read head, wherein the second output signal includes speed feedback information of the MICR subsystem resulting from movement of the MICR subsystem across the upper surface of the base.

17. The method of claim 16 wherein the MICR subsystem further comprises: a contact image sensor, wherein responsive to the slidably-moving step, further comprising the step of
utilizing the contact image sensor for imaging the document, wherein the controlled slidable movement resistance load results in
limiting speed of the slidable movement of the MICR subsystem across the upper surface of the base to be between approximately about:
a maximum speed limit that prevents failure of the imaging step performed by the contact image sensor, and
a minimum speed limit that prevents failure of the reading step performed by the MICR read head.

18. A method, comprising the steps of:
supportably-arranging a document in a fixed orientation upon an upper surface of a base of a document processor, wherein the document includes magnetic ink character data;
slidably-moving a MICR subsystem that is slidably-connected to the base across at least a portion of the upper surface of the base that supports the document in the fixed orientation, wherein the MICR subsystem includes a MICR read head and a contact image sensor; and
imparting a controlled slidable movement resistance load to the MICR subsystem from a speed limiting device that is connected to both of the base and the MICR subsystem as the MICR subsystem is slidably-moved for
maintaining a controlled scanning rate performed by the MICR read head when the MICR read head scans the magnetic ink character data of the document that is arranged in the fixed orientation upon the upper surface of the base of the document processor, and wherein, responsive to the slidably-moving step, further comprising the steps of
utilizing the MICR read head for reading the magnetic ink character data, and
utilizing the contact image sensor for imaging the document, wherein the controlled slidable movement resistance load results in:
limiting speed of the slidable movement of the MICR subsystem across the upper surface of the base to be between approximately about:
a maximum speed limit that prevents failure of the imaging step performed by the contact image sensor, and
a minimum speed limit that prevents failure of the reading step performed by the MICR read head.

19. The method of claim 18, wherein the slidable movement resistance device includes a dashpot that comprises: a piston connected to a piston rod, and a double-ended pneumatic cylinder, wherein the piston and the piston rod are disposed in the double-ended pneumatic cylinder, wherein, responsive to the slidably-moving step, further comprising the step of
driving the piston in the double-ended pneumatic cylinder.

20. The method of claim 18, wherein the MICR read head includes-MICR reading and recognition logic that is communicatively-coupled to the MICR read head; and an encoder that is communicatively-coupled to the MICR reading and recognition logic, wherein, responsive to the slidably-moving step, further comprising the step of
receiving, at the MICR reading and recognition logic:
a first output signal from the MICR read head, and
a second output signal from the encoder, wherein the first output signal includes a magnetic ink character signal indicative of the magnetic character data that was read by the MICR read head, wherein the second output signal includes speed feedback information of the MICR subsystem resulting from movement of the MICR subsystem across the upper surface of the base.

* * * * *